US011099894B2

United States Patent
Davis et al.

(10) Patent No.: US 11,099,894 B2
(45) Date of Patent: Aug. 24, 2021

(54) INTERMEDIATE HOST INTEGRATED CIRCUIT BETWEEN VIRTUAL MACHINE INSTANCE AND CUSTOMER PROGRAMMABLE LOGIC

(71) Applicant: Amazon Technologies, Inc., Seattle, WA (US)

(72) Inventors: Mark Bradley Davis, Justin, TX (US); Asif Khan, Cedar Park, TX (US); Christopher Joseph Pettey, Woodinville, WA (US); Erez Izenberg, Tel Aviv (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 15/279,164

(22) Filed: Sep. 28, 2016

(65) Prior Publication Data

US 2018/0088992 A1   Mar. 29, 2018

(51) Int. Cl.
*G06F 9/455* (2018.01)
*G06F 9/46* (2006.01)
(Continued)

(52) U.S. Cl.
CPC .......... *G06F 9/5005* (2013.01); *G06F 9/5077* (2013.01); *G06F 13/4068* (2013.01);
(Continued)

(58) Field of Classification Search
CPC .. G06F 9/5005; G06F 9/5077; G06F 9/45558; G06F 9/541; G06F 13/4068; G06F 2213/0038
(Continued)

(56) References Cited

U.S. PATENT DOCUMENTS 6,011,407 A   1/2000   New
6,034,542 A   3/2000   Ridgeway
(Continued)

FOREIGN PATENT DOCUMENTS

JP   H10232890 A   9/1998
JP   2000-10770    1/2000
(Continued)

OTHER PUBLICATIONS

Xilinx, "7 Series FPGAs Overview" (Year: 2011).*
(Continued)

*Primary Examiner* — Bradley A Teets
(74) *Attorney, Agent, or Firm* — Klarquist Sparkman, LLP

(57) ABSTRACT

A multi-tenant environment is described with configurable hardware logic (e.g., a Field Programmable Gate Array (FPGA)) positioned on a host server computer. For communicating with the configurable hardware logic, an intermediate host integrated circuit (IC) is positioned between the configurable hardware logic and virtual machines executing on the host server computer. The host IC can include management functionality and mapping functionality to map requests between the configurable hardware logic and the virtual machines. Shared peripherals can be located either on the host IC or the configurable hardware logic. The host IC can apportion resources amongst the different configurable hardware logics to ensure that no one customer can over consume resources.

20 Claims, 9 Drawing Sheets

(51) Int. Cl.
*G06F 9/50* (2006.01)
*G06F 13/40* (2006.01)
*G06F 9/54* (2006.01)

(52) U.S. Cl.
CPC .......... *G06F 9/45558* (2013.01); *G06F 9/541* (2013.01); *G06F 2213/0038* (2013.01)

(58) Field of Classification Search
USPC .......................................................... 718/1
See application file for complete search history.

(56) References Cited

U.S. PATENT DOCUMENTS

| | | | |
|---|---|---|---|
| 6,476,634 B1 | 11/2002 | Bilski | |
| 6,539,438 B1 | 3/2003 | Ledzius et al. | |
| 6,595,921 B1 | 7/2003 | Urbano et al. | |
| 6,693,452 B1 | 2/2004 | Ansari et al. | |
| 6,785,816 B1 | 8/2004 | Kivimaki et al. | |
| 6,802,026 B1 | 10/2004 | Patterson | |
| 6,826,717 B1 | 11/2004 | Draper et al. | |
| 7,117,481 B1 | 10/2006 | Agesen et al. | |
| 7,177,961 B2 | 2/2007 | Brice, Jr. et al. | |
| 7,243,221 B1 | 7/2007 | Ryser | |
| 7,281,082 B1 | 10/2007 | Knapp | |
| 7,313,794 B1 | 12/2007 | Ansari | |
| 7,451,426 B2 | 11/2008 | Pribbernow | |
| 7,564,727 B1 | 7/2009 | Huang | |
| 7,678,048 B1 | 3/2010 | Urbano et al. | |
| 7,706,417 B1 | 4/2010 | Rhodes | |
| 7,716,497 B1 | 5/2010 | Timberger | |
| 7,721,036 B2 | 5/2010 | Poplack et al. | |
| 7,734,859 B2 | 6/2010 | Daniel et al. | |
| 7,739,092 B1 | 6/2010 | Ballagh et al. | |
| 7,902,866 B1 * | 3/2011 | Patterson | G06F 17/5054 |
| | | | 326/38 |
| 7,904,629 B2 | 3/2011 | Daniel | |
| 7,962,582 B2 | 6/2011 | Potti et al. | |
| 8,058,899 B2 | 11/2011 | Vorbach et al. | |
| 8,145,894 B1 | 3/2012 | Casselman | |
| 8,219,989 B2 | 7/2012 | Armstrong et al. | |
| 8,390,321 B2 | 3/2013 | Nakaya | |
| 8,516,272 B2 | 8/2013 | Hofstee et al. | |
| 8,533,428 B2 | 9/2013 | Bennett et al. | |
| 8,561,065 B2 | 10/2013 | Cunningham et al. | |
| 8,621,597 B1 | 12/2013 | Jenkins, IV | |
| 8,626,970 B2 | 1/2014 | Craddock et al. | |
| 8,686,549 B2 | 4/2014 | Vorbach | |
| 8,726,337 B1 | 5/2014 | Curry et al. | |
| 8,776,090 B2 | 7/2014 | Elzur | |
| 8,799,992 B2 | 8/2014 | Marvais et al. | |
| 8,881,141 B2 | 11/2014 | Koch et al. | |
| 8,914,590 B2 | 12/2014 | Vorbach et al. | |
| 8,928,351 B1 | 1/2015 | Konduru | |
| 9,009,707 B2 | 4/2015 | Chandrakar et al. | |
| 9,038,072 B2 | 5/2015 | Nollet et al. | |
| 9,064,058 B2 | 6/2015 | Daniel | |
| 9,098,662 B1 | 8/2015 | Chin et al. | |
| 9,104,453 B2 | 8/2015 | Anand et al. | |
| 9,141,747 B1 | 9/2015 | Orthner | |
| 9,218,195 B2 | 12/2015 | Anderson et al. | |
| 9,298,865 B1 | 3/2016 | Peng | |
| 9,361,416 B2 | 6/2016 | Fine et al. | |
| 9,372,956 B1 | 6/2016 | Fan et al. | |
| 9,396,012 B2 | 7/2016 | Plondke et al. | |
| 9,483,639 B2 | 11/2016 | Sliwa et al. | |
| 9,503,093 B2 | 11/2016 | Karras et al. | |
| 9,590,635 B1 | 3/2017 | Sengupta | |
| 9,619,292 B2 | 4/2017 | Kodialam et al. | |
| 9,684,743 B2 | 6/2017 | Larzul | |
| 9,703,703 B2 | 7/2017 | LeMay et al. | |
| 9,747,185 B2 | 8/2017 | Fine | |
| 9,766,910 B1 | 9/2017 | Berg et al. | |
| 9,841,993 B2 | 12/2017 | Mine et al. | |
| 9,916,175 B2 | 3/2018 | Beckwith et al. | |
| 9,983,938 B2 | 5/2018 | Heil et al. | |
| 10,027,543 B2 | 7/2018 | Lanka et al. | |
| 10,037,222 B2 | 7/2018 | Bolic et al. | |
| 10,069,681 B2 | 9/2018 | Izenberg et al. | |
| 10,169,065 B1 | 1/2019 | Nye et al. | |
| 10,223,317 B2 | 3/2019 | Atta et al. | |
| 10,275,288 B2 | 4/2019 | Pinto et al. | |
| 10,338,135 B2 | 7/2019 | Davis et al. | |
| 10,461,937 B1 | 10/2019 | Allen | |
| 10,705,995 B2 | 7/2020 | Khan et al. | |
| 10,778,653 B2 | 9/2020 | Atta et al. | |
| 2004/0113655 A1 | 7/2004 | Curd et al. | |
| 2004/0236556 A1 | 11/2004 | Lin | |
| 2005/0081199 A1 | 4/2005 | Traut | |
| 2005/0198235 A1 | 9/2005 | Kumar et al. | |
| 2008/0013569 A1 | 1/2008 | Boren | |
| 2008/0028186 A1 | 1/2008 | Casselman | |
| 2008/0051075 A1 | 2/2008 | Einloth et al. | |
| 2010/0161870 A1 | 6/2010 | Daniel | |
| 2011/0047546 A1 | 2/2011 | Kivity et al. | |
| 2012/0005473 A1 | 1/2012 | Hofstee et al. | |
| 2012/0254885 A1 * | 10/2012 | Cai | G06F 9/5016 |
| | | | 718/104 |
| 2013/0145431 A1 | 6/2013 | Kruglick | |
| 2013/0152099 A1 | 6/2013 | Bass et al. | |
| 2013/0205295 A1 | 8/2013 | Ebcioglu et al. | |
| 2013/0318240 A1 | 11/2013 | Hebert et al. | |
| 2014/0215424 A1 * | 7/2014 | Fine | G06F 17/5054 |
| | | | 716/117 |
| 2014/0297405 A1 * | 10/2014 | Fine | G06F 11/3419 |
| | | | 705/14.53 |
| 2014/0351811 A1 | 11/2014 | Kruglick | |
| 2014/0380025 A1 | 12/2014 | Kruglick | |
| 2015/0026385 A1 | 1/2015 | Egi et al. | |
| 2015/0128268 A1 | 5/2015 | Fine et al. | |
| 2015/0169376 A1 | 6/2015 | Chang et al. | |
| 2015/0227662 A1 | 8/2015 | Lepercq | |
| 2016/0034295 A1 | 2/2016 | Cochran | |
| 2016/0094413 A1 | 3/2016 | Jain | |
| 2016/0111168 A1 | 4/2016 | Cline et al. | |
| 2016/0210167 A1 | 7/2016 | Bolic et al. | |
| 2016/0239906 A1 | 8/2016 | Kruglick | |
| 2016/0285628 A1 | 9/2016 | Carrer et al. | |
| 2016/0321081 A1 | 11/2016 | Kim et al. | |
| 2016/0371021 A1 | 12/2016 | Goldberg et al. | |
| 2017/0090992 A1 | 3/2017 | Bivens et al. | |
| 2017/0153854 A1 * | 6/2017 | Zheng | G06F 3/0613 |
| 2017/0187831 A1 | 6/2017 | Otting et al. | |
| 2017/0213053 A1 | 7/2017 | Areno et al. | |
| 2017/0250802 A1 | 8/2017 | Shimizu et al. | |
| 2018/0027067 A1 | 1/2018 | Guim Bernat et al. | |
| 2018/0034793 A1 | 2/2018 | Kibalo et al. | |
| 2018/0075231 A1 | 3/2018 | Subramanian et al. | |
| 2018/0077144 A1 | 3/2018 | Gangawane et al. | |
| 2018/0082083 A1 | 3/2018 | Smith et al. | |
| 2018/0088174 A1 | 3/2018 | Davis et al. | |
| 2018/0089119 A1 | 3/2018 | Khan et al. | |
| 2018/0089343 A1 | 3/2018 | Atta | |
| 2018/0091484 A1 | 3/2018 | Atta et al. | |
| 2018/0095670 A1 | 4/2018 | Davis et al. | |
| 2018/0095774 A1 | 4/2018 | Atta et al. | |
| 2018/0189081 A1 | 7/2018 | Upasani et al. | |
| 2019/0123894 A1 | 4/2019 | Yuan | |
| 2020/0412701 A1 | 12/2020 | Atta et al. | |

FOREIGN PATENT DOCUMENTS

| | | |
|---|---|---|
| JP | 2002-530780 | 9/2002 |
| JP | 2002-366597 | 12/2002 |
| JP | 2005-107911 A | 4/2005 |
| JP | 2005-536726 | 12/2005 |
| JP | 2007-243671 | 9/2007 |
| JP | 2008-516310 A | 5/2008 |
| JP | 2008-523727 A | 7/2008 |
| JP | 2009-159365 | 7/2009 |
| JP | 2010-117968 | 5/2010 |
| JP | 2013045219 A | 8/2011 |
| JP | 2014-500644 A | 1/2014 |
| JP | 2014-525709 A | 9/2014 |
| JP | 2014178784 A | 9/2014 |

(56) References Cited

FOREIGN PATENT DOCUMENTS

| JP | 2014230174 A | 12/2014 |
|---|---|---|
| JP | 2015-507234 A | 3/2015 |
| JP | 2019-530099 | 10/2019 |
| JP | 2019-534618 | 11/2019 |
| JP | 2019-535092 | 12/2019 |
| JP | 2019-537099 | 12/2019 |
| JP | 2020-64678 | 4/2020 |
| WO | WO 02/01425 | 1/2002 |
| WO | WO 2004/075056 | 9/2004 |
| WO | WO 2010/100871 | 9/2010 |
| WO | WO 2013/158707 | 10/2013 |
| WO | WO 2015/042684 | 4/2015 |
| WO | WO 2016/100979 | 6/2016 |

OTHER PUBLICATIONS

Hutchings et al., "Implementation Approaches for Reconfigurable Logic Application," Proceedings of the 5th International Workshop on Field Programmable Logic and Applications, Aug.-Sep. 1995, pp. 419-428.

Byma et al., "FPGAs in the Cloud: Booting Virtualized Hardware Accelerators with OpenStack," 2014 IEEE 22nd Annual International Symposium on Field-Programmable Custom Computing Machines, May 2014, pp. 109-116.

"SDAccel Development Environment User Guide," Xilinx, Inc., © 2016, 85 pages.

"The Xilinx SDAccel Development Environment Bringing the Best Performance/Watt to the Data Center," Xilinx, Inc., © 2014, 6 pages.

Chen et al., "Enabling FPGAs in the Cloud," ACM Computing Frontiers, May 2014, pp. 1-10.

Eguro et al., "FPGAs for trusted cloud computing," 2012 22nd International Conference on Field Programmable Logic and Applications, Aug. 2012, pp. 63-70.

Eslami et al., "Enabling Effective FPGA Debug Using Overlays: Opportunities and Challenges," 2nd International Workshop on Overlay Architectures for FPGAs, Jun. 2016, pp. 1-6.

Fahmy et al., "Virtualized FPGA Accelerators for Efficient Cloud Computing," 2015 IEEE 7th International Conference on Cloud Computing Technology and Science, 2015, pp. 430-435.

International Search Report and Written Opinion for PCT/US2017/054175, dated Jan. 11, 2018, 12 pages.

"SDAccel Development Environment," Xilinx, Inc., document downloaded from http://www.xilinx.com/products/design-tools/software-zone/sdaccel.html on Jul. 25, 2016, 9 pages.

Weerasinghe et al., "Enabling FPGAs in the Hyperscale Data Centers," 2015 IEEE $12^{th}$ International Conference on Ubiquitous Intelligence and Computing, 2015 IEEE $12^{th}$ International Conference on Autonomic and Trusted Computing, and 2015 IEEE $15^{th}$ International Conference on Scalable Computing and Communications and ITS Associated Workshops, Aug. 2015, pp. 1078-1086.

Zazo et al., "A PCIe DMA engine to support the virtualization of 40 Gbps FPGA-accelerated network appliances," 2015 IEEE International Conference on Reconfigurable Computing and FPGAs, Dec. 2015, pp. 1-6.

Hori et al., "Bitstream encryption and authentication with AES-GCM in dynamically reconfigurable systems," The Institute of Electronics, Information and Communication Engineers, May 2008, pp. 13-18.

Knodel et al., "Computing Framework for Dynamic Integration of Reconfigurable Resources in a Cloud," 2015 Euromicro Conference on Digital System Design, Aug. 2015, pp. 337-344.

* cited by examiner

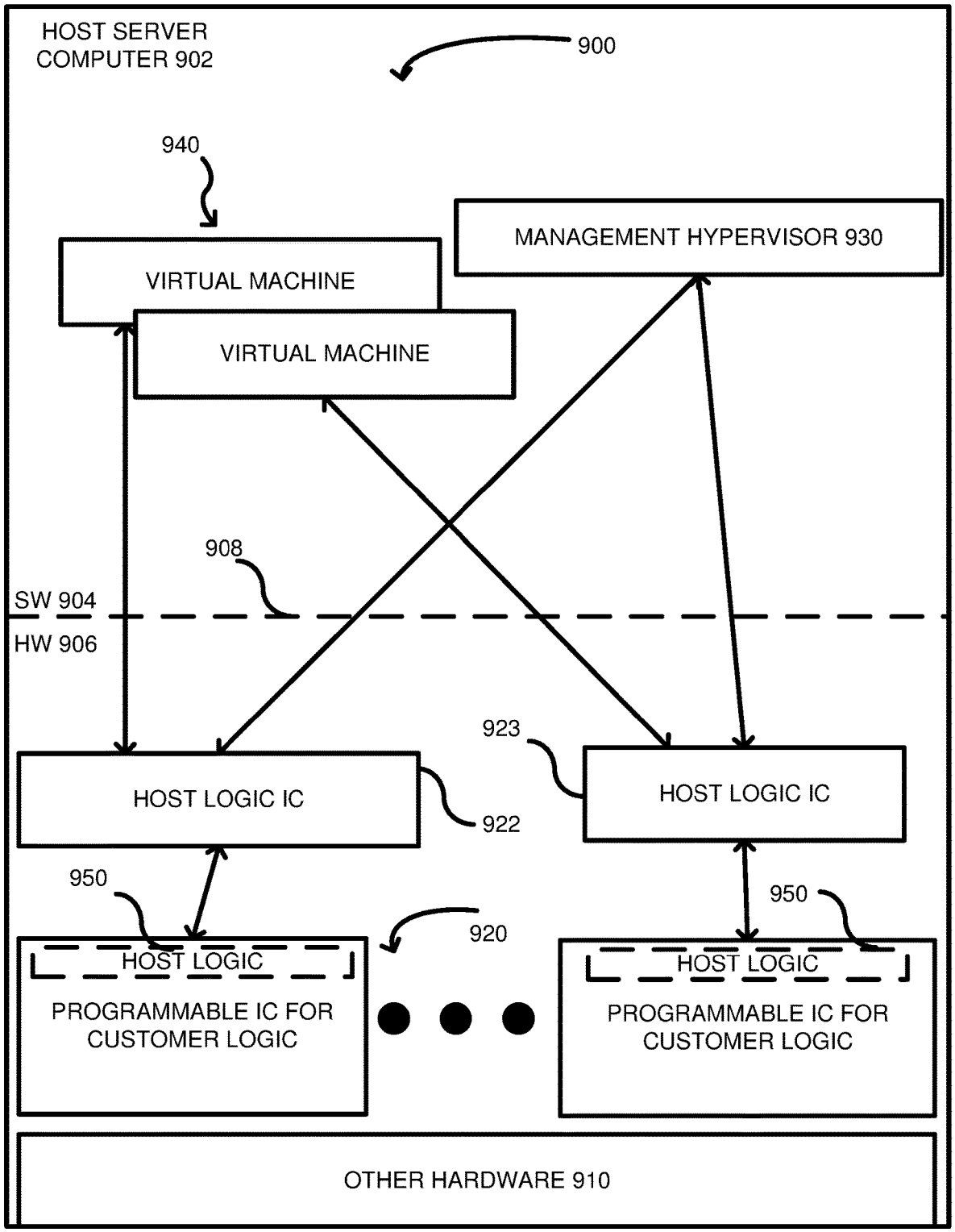

INTERMEDIATE HOST INTEGRATED CIRCUIT BETWEEN VIRTUAL MACHINE INSTANCE AND CUSTOMER PROGRAMMABLE LOGIC

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

The users of large computer systems may have diverse computing requirements resulting from different use cases. A cloud or compute service provider can provide various different computer systems having different types of components with varying levels of performance and/or functionality. Thus, a user can select a computer system that can potentially be more efficient at executing a particular task. For example, the compute service provider can provide systems with varying combinations of processing performance, memory performance, storage capacity or performance, and networking capacity or performance. Generally, multiple customers can share and leverage generic resources offered by the compute service provider, making it more cost efficient for customers to use the compute service provider's services.

BRIEF DESCRIPTION OF THE DRAWINGS

FIG. 9 is an example system diagram according to another embodiment with multiple host ICs positioned between programmable ICs and virtual machines.

DETAILED DESCRIPTION

Figure 1:
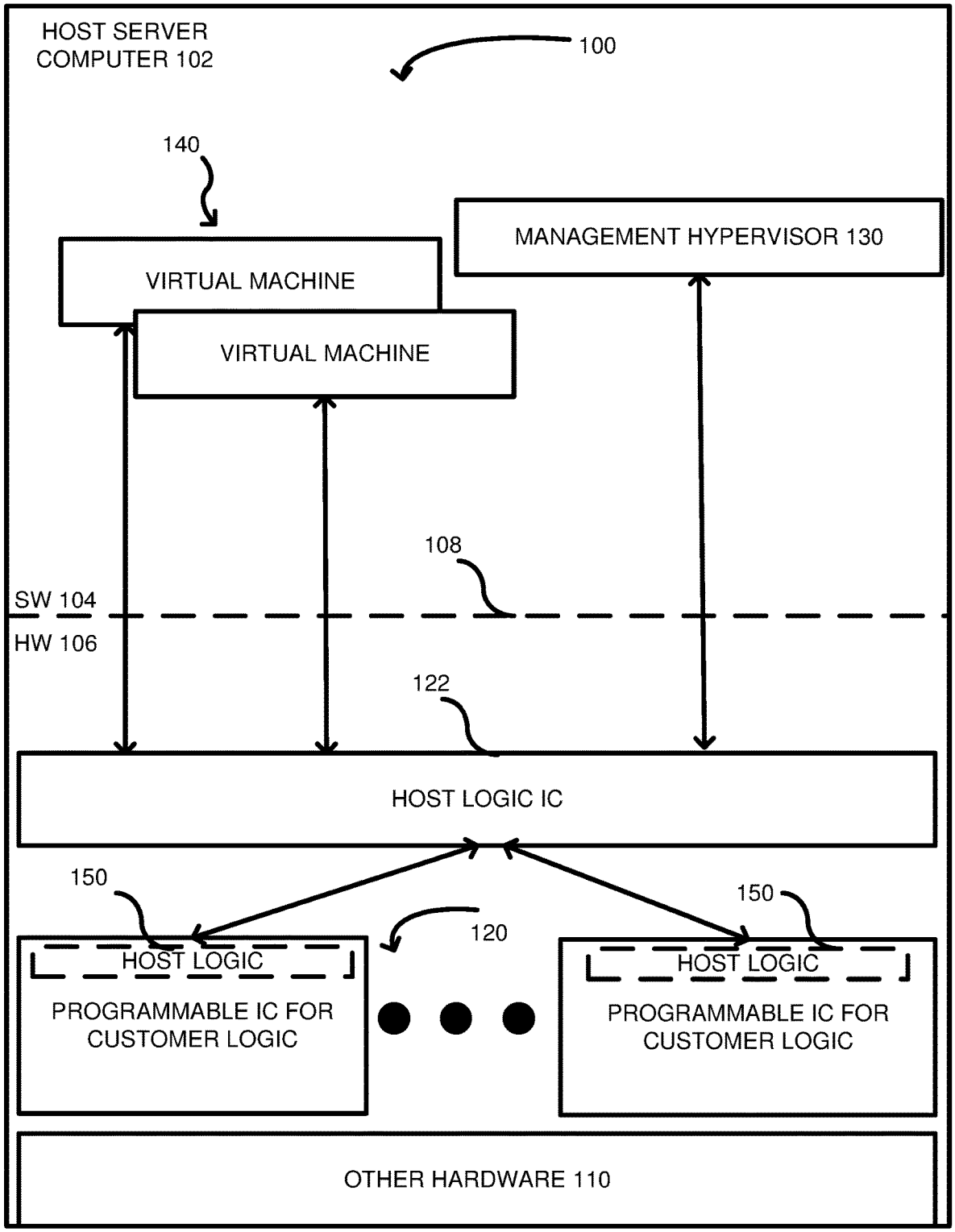
FIG. 1 is an example system diagram wherein a host logic Integrated Circuit (IC) is positioned between multiple programmable ICs for customer logic.

Providing custom hardware in a cloud environment, in some respects, goes against one of the core benefits of sharing generic hardware, such as a server computer, across multiple customers. However, programmable logic, such as a Field Programmable Gate Array (FPGA), is sufficiently generic and can be programmed by customers and then reused by other customers. Thus, one solution for providing specialized computing resources within a set of reusable general computing resources is to provide a server computer comprising a configurable logic platform (such as by providing a server computer with an add-in card including one or more FPGAs) as a choice among the general computing resources. Configurable logic is hardware that can be programmed or configured to perform a logic function that is specified by configuration data that is applied to or loaded on the configurable logic. For example, a user of the computing resources can provide a specification (such as source code written in a hardware description language) for configuring the configurable logic, the configurable logic can be configured according to the specification, and the configured logic can be used to perform a task for the user. However, allowing a user access to low-level hardware of the computing facility can potentially introduce security and privacy issues within the computing facility. As a specific example, a faulty or malicious design from one user could potentially cause a denial of service to other users if the configured logic caused one or more server computers within the computing facility to malfunction (e.g., crash, hang, or reboot) or be denied network services. As another specific example, a faulty or malicious design from one user could potentially corrupt or read data from another user if the configured logic is able to read and/or write memory of the other user's memory space.

As described herein, a compute service's facility can include a variety of computing resources, where one type of the computing resources can include a server computer comprising a configurable logic platform. The configurable logic platform can be programmed or configured by a user of the computer system so that hardware (e.g., the configurable logic) of the computing resource is customized by the user. For example, the user can program the configurable logic so that it functions as a hardware accelerator that is tightly coupled to the server computer. As a specific example, the hardware accelerator can be accessible via a local interconnect, such as Peripheral Component Interconnect Express (PCI-Express or PCIe), of the server computer. The user can execute an application on the server computer and tasks of the application can be performed by the hardware accelerator using PCIe transactions. By tightly coupling the hardware accelerator to the server computer, the latency between the accelerator and the server computer can be reduced which can potentially increase the processing speed of the application. The configurable logic platform can be a wide variety of reconfigurable logic ICs, but a typical example is a FPGA, which will be used in specific examples below, but should be understood that other reconfigurable hardware can be used instead.

The compute service provider can potentially increase the security and/or availability of the computing resources by wrapping or encapsulating the user's hardware (also referred to herein as application logic) within host logic of the configurable logic platform. Encapsulating the application logic can include limiting or restricting the application logic's access to configuration resources, physical interfaces, hard macros of the configurable logic platform, and various peripherals of the configurable logic platform. For example, the compute service provider can manage the programming of the configurable logic platform so that it includes both the host logic and the application logic. The host logic can provide a framework or sandbox for the application logic to work within. In particular, the host logic can communicate with the application logic and constrain the functionality of the application logic. For example, the host logic can perform bridging functions between the local interconnect (e.g., the PCIe interconnect) and the application logic so that the application logic cannot directly control the signaling on the local interconnect. The host logic can be responsible for forming packets or bus transactions on the local interconnect and ensuring that the protocol requirements are met. By controlling transactions on the local interconnect, the host logic can potentially prevent malformed transactions or transactions to out-of-bounds locations. As another example, the host logic can isolate a configuration access port so that the application logic cannot cause the configurable logic platform to be reprogrammed without using services provided by the compute services provider.

In some embodiments, the host logic can be on a separate IC, such as an FPGA, Application Specific IC (ASIC) or System on Chip (SoC), positioned intermediate the virtual machines and the configurable hardware platform and programmed by a hypervisor. The intermediate host logic IC provides the customer with the experience that the configurable hardware platform is entirely under the customer control, with the ability to communicate to the virtual machines using a PCIe interface, the ability to perform partial dynamic reconfiguration (PDR), Hybrid Memory Cube (HMC) or other standard memory interfaces, etc. In some embodiments, the intermediate host logic IC can provide an upward facing PCIe interface to the virtual machines and a downward facing PCIe interface to the customer FPGA. In this way, the customer FPGA operates as if it is communicating directly to a virtual machine and the virtual machine operates as if it is communicating directly with the customer FPGA. Instead, the host IC can provide any desired intermediate management and security functions while passing communications (also called transactions or instructions) between the virtual machine and the customer FPGA. In some embodiments, some additional host logic can be positioned within the customer FPGA, such as by providing the customer an encrypted RTL block to include in the customer logic. The host logic IC virtualizes the customer FPGA so that the customer logic operates as if it is communicating directly to a virtual machine.

The host logic IC can also perform a mapping function wherein it maps communications from multiple virtual machines to the appropriate customer FPGA. Thus, through a single host IC, multiple virtual machines can communicate with different programmable ICs, which include customer logic.

FIG. 1 is a system diagram showing an example computing system 100 including a host server computer 102 having a software portion 104 and a hardware portion 106 diagrammatically separated by dashed line 108. The hardware portion 106 includes one or more CPUs, memory, storage devices, etc. shown generically as other hardware at 110. The hardware portion 106 can further include programmable Integrated Circuits (ICs), shown generally at 120. The programmable ICs can be FPGAs or other types of programmable logic, such as complex programmable logic devices (CPLDs). The programmable ICs are designed to be programmed by customers after manufacturing and contain an array of programmable logic blocks and configurable interconnects linking the logic blocks together. The logic blocks can be programmed to perform hardware functions from simple gates to complex combinational functions. In any event, the programmable ICs refers to at least gates of hardware being programmed, and is not meant to include storing simple values in a register to configure an existing hardware function. Rather, it is the hardware itself that is formed from the programming. Any number of programmable ICs 120 can be used in the host server computer 102 as further described below. Furthermore, the programmable ICs 120 can include logic from different customers so that multiple customers are operating on a same server computer 102 without knowing each other's presence.

The hardware portion 106 further includes at least one intermediate host logic IC 122 that performs management, security and mapping functions between the programmable ICs 120 and the software portion 104. The host logic IC can also be reprogrammable logic, such as an FPGA, or otherwise non-reprogrammable hardware, such as an ASIC or a SoC.

Running a layer above the hardware 106 in the software portion 104 is a hypervisor or kernel layer, shown in this example as including a management hyperviser 130. The hypervisor or kernel layer can be classified as a type 1 or type 2 hypervisor. A type 1 hypervisor runs directly on the host hardware to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. The management hypervisor 130 can generally include device drivers needed for accessing the hardware 106.

The software portion 104 can include a plurality of partitions for running virtual machines, shown generally at 140. The partitions are logical units of isolation by the hypervisor and are executing virtual machines. Each partition can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Each virtual machine 140 can communicate through a hardware interface (not shown, but described further below) to the host logic IC 122. The host logic IC 122 can map the communication to the appropriate programmable IC 120 so that the programmable ICs 120 believe they are communicating directly with the virtual machines 140. In some embodiments, a thin layer of host logic 150 can be included in the programmable IC 120 associated with the customer. As further described below, this additional host logic 150 can include interface logic for communicating between the host logic IC 122 and the programmable ICs 120.

In one example, the hypervisor can be a Xen-based hypervisor, although other hypervisors can be used as described above. In the Xen example, the management hypervisor 130 is Domain 0 (also called Dom 0), while the VMs 140 are Domain U guests. The Domain 0 hypervisor has special rights to access physical I/O resources as well as interact with the Domain U guests. The Domain U guests do not have access to the hardware layer 106 without authorization from the Domain 0. As such, the Domain 0 is a management layer that ensures logical isolation (sandboxing) of the programmable ICs 120.

The management hypervisor 130 is responsible for the programmable ICs 120 including the configuration and control of the programmable ICs. Additionally, the management hypervisor 130 can have control of an interface bus, such as a PCIe interface. Through the interface, the management hypervisor 130 has management and control of programming of the hardware in the programmable ICs 120. However, programming of the programmable ICs 120 can also occur directly from the virtual machines 140 through the host logic IC 122. In this way, the management hypervisor 130 can securely manage the programmable ICs configuration ports and protect the customer IP programmed within the programmable ICs. Additionally, the management hypervisor 130 can serve as a main interface to external managed services for configuration and operation of the programmable ICs. However, when the management hypervisor 130 performs the programming and management of the programmable ICs, it can do so through the intermediate host logic IC 122, which is also positioned between the management hypervisor 130 and the programmable ICs. Thus, the host logic IC 122 can be an intermediate IC that includes host logic for routing communications from multiple virtual machines 140 to multiple programmable ICs 120 and can provide additional management, security and configuration for the multiple programmable ICs 120.

Figure 2:
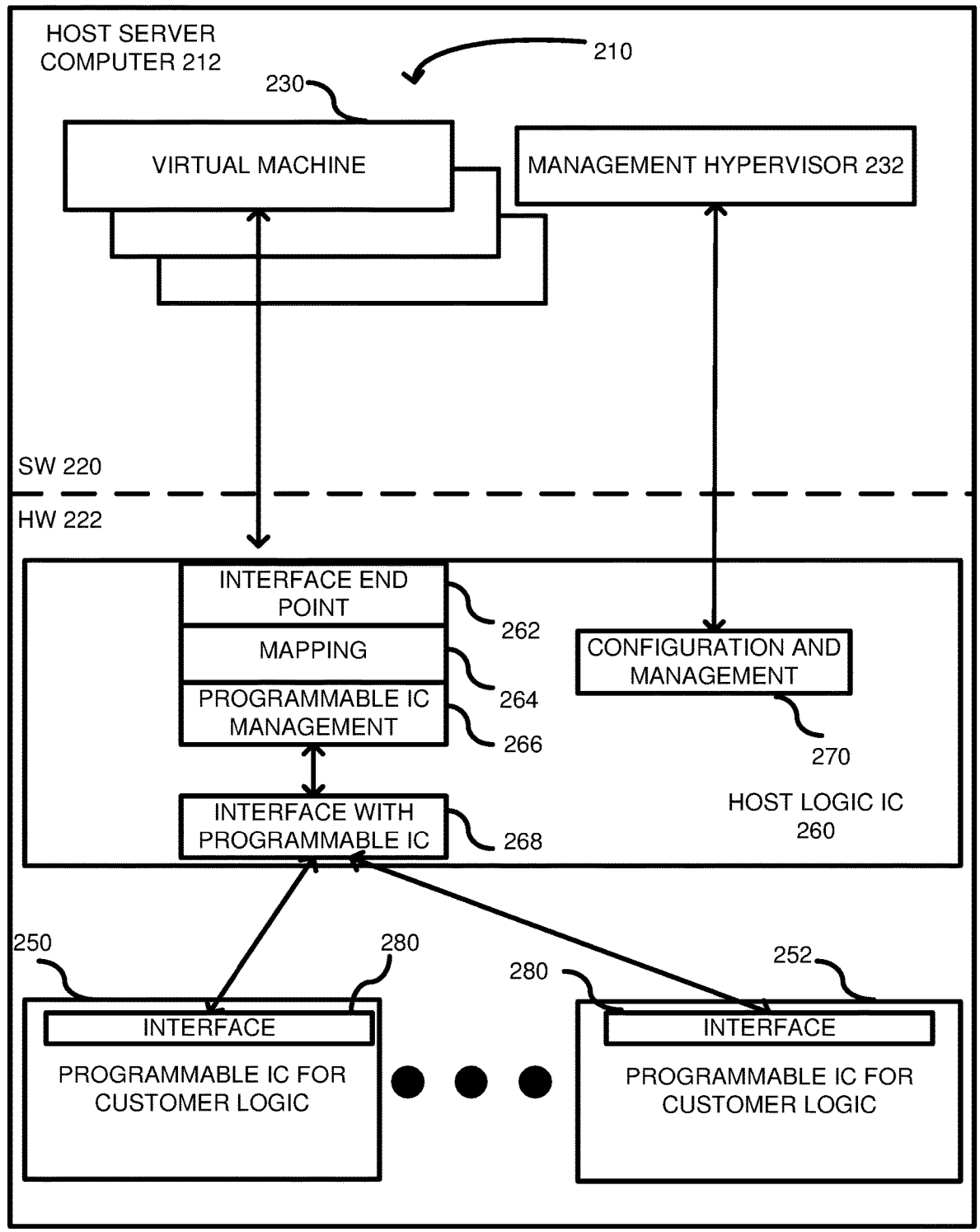
FIG. 2 is an example embodiment showing further details of the host logic IC.

FIG. 2 provides another embodiment of a system 210 for virtualizing customer programmable ICs. The system 210 includes a host server computer 212 including a software portion 220 and a hardware portion 222. The software portion 220 includes a plurality of virtual machines 230 and a management hypervisor 232. The management hypervisor 232 partitions resources of the server computer to the virtual machines 230 so that each virtual machine can share processing capacity, memory, etc. of the host server computer 212. Each virtual machine 230 can be associated with its own respective programmable IC 250-252, wherein there are any integer number of programmable ICs in the host server computer 212. Although not shown, any one of the virtual machines 230 can communicate with multiple programmable ICs 250-252 (e.g., FPGA). Communication between the virtual machines 230 and the programmable ICs 250-252 occurs via an intermediate host logic IC 260, which itself can be programmable hardware logic, such as an FPGA, that is programmed by the management hypervisor 232. The host logic IC 260 can also be a fixed, non-programmable hardware logic, such as an ASIC.

The host logic IC 260 includes an interface endpoint 262 designed so that the virtual machines 230 believe they are communicating directly with the programmable ICs 250-252. However, instead, their communication is passed through a mapping function 264 that determines which programmable IC 250-252 should be forwarded the communication. Additionally, at 266, the host logic IC 260 can include management hardware 266 that performs security functionality, monitoring functionality, etc. The management hardware 266 also ensures encapsulation or sandboxing of the programmable ICs 250-252 so that one customer cannot obtain secure information associated with the operation of another customer's programmable IC. Likewise, the management logic 266 can include functionality to ensure that the programmable ICs are not utilizing more resources than other programmable ICs. The management logic 266 can pass the communication to an interface 268, which then transmits the communication to an appropriate end point interface 280 on the respective programmable IC associated with the virtual machine that transmitted the communication. Communication from the programmable ICs 250-252 back to the virtual machines 230 occurs is a similar fashion. The programmable ICs 250-252 communicate through the interface 280 as if they are communicating directly with the virtual machines 230. The host logic IC 260 further includes configuration and management functionality 270 that can be used by the management hypervisor 232 to program the programmable ICs 250-252.

The programmable ICs can include reconfigurable logic blocks (reconfigurable hardware) and other hardware. The reconfigurable logic blocks can be configured or programmed to perform various functions as desired by a customer of the compute service provider. The reconfigurable logic blocks can be programmed multiple times with different configurations so that the blocks can perform different hardware functions over the lifetime of the device. The functions of the programmable IC 250 can be categorized based upon the purpose or capabilities of each function, or based upon when the function is loaded into the programmable IC 250. For example, the programmable IC 250 can include static logic, reconfigurable logic, and hard macros. The functionality for the static logic, reconfigurable logic, and hard macros can be configured at different times. Thus, the functionality of the programmable IC 250 can be loaded incrementally.

A hard macro can perform a predefined function and can be available when the programmable IC is powered on. For example, a hard macro can include hardwired circuits that perform a specific function. As specific examples, the hard macros can include a configuration access port (CAP) for configuring the programmable IC 250, a serializer-deserializer transceiver (SERDES) for communicating serial data, a memory or dynamic random access memory (DRAM) controller for signaling and controlling off-chip memory (such as a double data rate (DDR) DRAM), and a storage controller for signaling and controlling a storage device. Other types of communication ports can be used as the shared peripheral interface. Other types include, but are not limited to, Ethernet, a ring topology, or other types of networking interfaces.

The static logic can be loaded at boot time onto reconfigurable logic blocks. For example, configuration data specifying the functionality of the static logic can be loaded from an on-chip or off-chip flash memory device during a boot-up sequence. The boot-up sequence can include detecting a power event (such as by detecting that a supply voltage has transitioned from below a threshold value to above the threshold value) and de-asserting a reset signal in response to the power event. An initialization sequence can be triggered in response to the power event or the reset being de-asserted. The initialization sequence can include reading configuration data stored on a flash device and loading the configuration data onto the programmable IC so that at least a portion of the reconfigurable logic blocks are programmed with the functionality of the static logic. After the static logic is loaded, the programmable IC 250 can transition from a loading state to an operational state that includes the functionality of the static logic.

The reconfigurable logic can be loaded onto reconfigurable logic blocks while the programmable IC 250 is operational (e.g., after the static logic has been loaded). The configuration data corresponding to the reconfigurable logic can be stored in an on-chip or off-chip memory and/or the configuration data can be received or streamed from an interface (e.g., the interface 280). The reconfigurable logic can be divided into non-overlapping regions, which can interface with static logic. For example, the reconfigurable regions can be arranged in an array or other regular or semi-regular structure. For example, the array structure may include holes or blockages where hard macros are placed within the array structure. The different reconfigurable regions can communicate with each other, the static logic, and the hard macros by using signal lines that can be specified as static logic. The different reconfigurable regions can be configured at different points in time so that a first reconfigurable region can be configured at a first point in time and a second reconfigurable region can be configured at a second point in time.

The functions of the programmable IC 250 can be divided or categorized based upon the purpose or capabilities of the functions. For example, the functions can be categorized as control plane functions, data plane functions, and shared functions. A control plane can be used for management and configuration of the programmable IC. The data plane can be used to manage data transfer between customer logic loaded onto the programmable IC and the server computer. Shared functions can be used by both the control plane and the data plane. The control plane functionality can be loaded onto the programmable IC 250 prior to loading the data plane functionality. The data plane can include encapsulated reconfigurable logic configured with customer application logic. The control plane can include host logic associate with a content service provider.

Generally, the data plane and the control plane can be accessed using different functions, where the different functions are assigned to different address ranges. Specifically, the control plane functions can be accessed using a management function and the data plane functions can be accessed using a data path function or an application function. The address mapping layer 264 can differentiate transactions bound for the control plane or the data plane. The transactions can be sent over a physical interconnect and received at the interconnect interface 280. The interconnect interface can be an endpoint of the physical interconnect. It should be understood that the physical interconnect can include additional devices (e.g., switches and bridges) arranged in a fabric for connecting devices or components to the server computer 212.

In sum, the functions can be categorized as control plane functions and application functions. The control plane functions can be used to monitor and restrict the capabilities of the data plane. The data plane functions can be used to accelerate a user's application that is running on the server computer. By separating the functions of the control and data planes, the security and availability of the server computer 212 and other computing infrastructure can potentially be increased. For example, the application logic cannot directly signal onto the physical interconnect because the intermediary layers of the control plane control the formatting and signaling of transactions of the physical interconnect. As another example, the application logic can be prevented from using the private peripherals which could be used to reconfigure the programmable IC and/or to access management information that may be privileged. As another example, the application logic can access hard macros of the programmable IC through intermediary layers so that any interaction between the application logic and the hard macros is controlled using the intermediary layers.

Control plane functionality is largely maintained on the host logic IC 260, while data plane functionality is maintained on the programmable ICs 250, 252. By separating the control plane and data plane into different ICs, the customer experience of using the programmable IC 250 is more in-line with non-multi-tenant environments. Although the above-described functionality relates to the programmable IC 250, it equally can be applied to the functionality of other programmable ICs (e.g., 252) on the host server computer 212.

Figure 3:
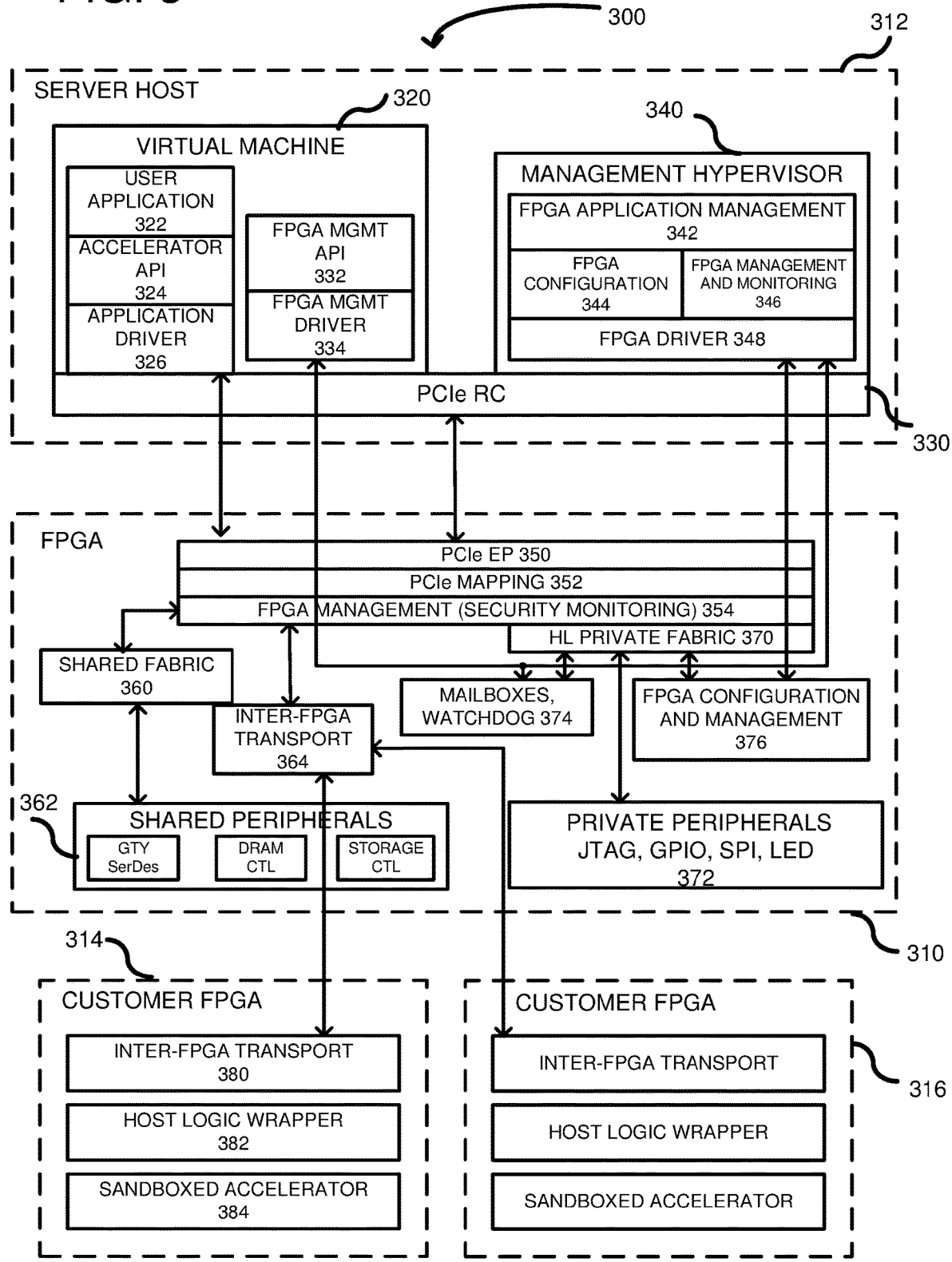
FIG. 3 is an example of an embodiment wherein the host logic IC is a Field Programmable Gate Array (FPGA) positioned between a virtual machine and multiple customer FPGAs, wherein the host logic IC includes shared peripherals.

FIG. 3 is a detailed example of one embodiment of a system 300 wherein an intermediate host FPGA 310 is positioned between a server host 312 and multiple customer FPGAs 314, 316. Although two customer FPGAs 314, 316 are shown, additional customer FPGAs can be added. Additionally, although the intermediate host 310 is shown as FPGA, other types of ICs can be used, such as ASICs or SoCs. The customer FPGAs 314, 316 and the host FPGA 310 can be positioned on one or more plug-in cards on the host server computer 312 or otherwise positioned on a motherboard of the host server computer.

The server host 312 can execute one or more virtual machines, such as virtual machine 320. In this particular example, the virtual machine 320 include applications for supporting accelerator hardware programmed into the customer FPGA 314, but other hardware can be used in place of the accelerator. The virtual machine 320 can include a user application 322, an accelerator API 324, and an application driver 326. The user application 322 can send commands and receive requests to and from the customer FPGA 314 via the accelerator API 324. The API 324 communicates the commands and requests through an application driver 326. The application driver 326 communicates through a PCIe root complex 330 positioned on the server host 312. The root complex connects a processor and memory subsystem on the server host 312 to a PCI switch fabric, which includes switching devices. In this way, the root complex is considered routing logic. The virtual machine 320 further includes an FPGA management API 332 and an FPGA management driver 334, which can be used in the configuration and management of the customer FPGA 314. Although other virtual machines are not shown, each virtual machine has its own FPGA management API and management driver for controlling its respective FPGA. A management hypervisor 340 can execute an FPGA management application 342, FPGA configuration 344 and FPGA management and monitoring 346. These applications can communicate and control the FPGAs through an FPGA driver 348. The management hypervisor 340 can oversee and manage multiple virtual machines, including virtual machine 320.

The intermediate host FPGA 310 includes multiple modules for configuring, managing, and communicating with the customer FPGAs 314, 316. The FPGA 310 includes a PCIe endpoint 350 that acts as an endpoint to which the root complex 330 can switch communications. A PCIe mapping layer 352 can differentiate transactions from the server computer 312 bound for the different customer FPGAs 314, 316. Specifically, if the address of the transaction falls within an address range of customer FPGA 314, then the transaction can be routed accordingly to FPGA 314. Alternatively, if the address falls within a range of customer FPGA 316, then the transaction is so routed. If other customer FPGAs are present, then transactions can be similarly routed to such FPGAs. Transactions pass through an FPGA management layer 354, which provides security and monitoring of the transactions to ensure that encapsulation is maintained between customers. For example, the FPGA management layer can potentially identify transactions or data that violate predefined rules and can generate an alert in response. Additionally or alternatively, the FPGA management 354 can terminate any transactions generated that violate any predetermined criteria. For valid transactions, the FPGA management layer 354 can forward the transactions to a shared fabric layer 360, which can then forward the transaction to shared peripherals 362, which can include a serial port, such as GTY SerDes, a DRAM controller, and a storage controller. Shared peripherals are shared functions that are accessible from either the control plane or the data plane. The shared peripherals are components that can have multiple address mappings and can be used by both the control plane and the data plane. Examples of the shared peripherals include the SerDes interface, DRAM control (e.g., DDR DRAM), storage device control (e.g., hard disk drives and solid-state drives), and other various components that can be used to generate, store, or process information. The shared peripherals 362 can include additional peripheral control. By having the shared peripherals within the intermediate host FPGA 310, the amount of resources used by any one customer can be controlled so that all customers receive resources in fair proportions. Communications destined for the FPGAs 314, 316 can pass through an inter-FPGA transport layer 364, which can be a serial bus, Ethernet bus, ring topology, or any desired communication mechanism. Other communications can pass through a host logic private fabric 370 for accessing private peripherals 372. Private peripherals 372 are components that are only accessible by the compute service provider and are not accessible by customers. The private peripherals can include JTAG (e.g., IEEE 1149.1), General purpose I/O (GPIO), serial peripheral interface (SPI) flash memory, and light emitting displays (LEDs). The illustrated peripherals are just examples and other peripherals can be used.

The mailboxes and watchdog timers 374 are shared functions that are accessible from either the control plane or the data plane. Specifically, the mailboxes can be used to pass messages and other information between the control plane and the data plane. For example, the mailboxes can include buffers, control registers (such as semaphores), and status registers. By using the mailboxes as an intermediary between the control plane and the data plane, isolation between the data plane and the control plane can potentially be increased, which can increase the security of the configurable hardware platform. The watchdog timers can be used to detect and recover from hardware and/or software malfunctions. For example, a watchdog timer can monitor an amount of time taken to perform a particular task, and if the amount of time exceeds a threshold, the watchdog timer can initiate an event, such as writing a value to a control register or causing an interrupt or reset to be asserted.

The FPGA configuration and management block 376 can include functions related to managing and configuring the FPGAs 314, 316. For example, the configuration and management block 376 can provide access for configuring the FPGAs. Specifically, the server computer 312 can send a transaction to block 376 to initiate loading of sandboxed accelerators within the customer FPGAs 314, 316.

Each customer FPGA 314, 316 can include an inter-FPGA transport block 380, which is the communication interface for communicating data or control functions between customer FPGA and the intermediate host FPGA 310. The inter-FPGA transport block can be provided to the customer to include within the customer logic using encrypted RTL code or other means. A host logic wrapper 382 can be positioned between the inter-FPGA transport interface and a sandboxed accelerator 384 (which is the customer hardware logic) for facilitating communication there between. Although an accelerator functionality is shown, other customer logic functions can be used.

The intermediate FPGA 310, allows the customer FPGA to be dedicated almost exclusively to the customer, with only a small portion of the FPGA including host logic (i.e., the transport block 380 and the host logic wrapper 382). The host FPGA 310 can physically be a smaller FPGA than the customer FPGAs 314, 316 (less configurable logic blocks) and virtualizes the customer FPGAs from the host server computer 312 in much the same way that the management hypervisor 340 virtualizes the virtual machine 320. In this way, the virtual machine 320 believes it is communicating directly with the customer FPGA using the PCIe end point 350. However, the intermediate FPGA performs mapping and security functions prior to passing data and/or commands to the customer FPGAs. Likewise, the customer FPGA believes that it is communicating directly with the virtual machine 320, but its messages are passed up through the intermediate FPGA for security, monitoring and mapping back to the corresponding virtual machine.

Figure 4:
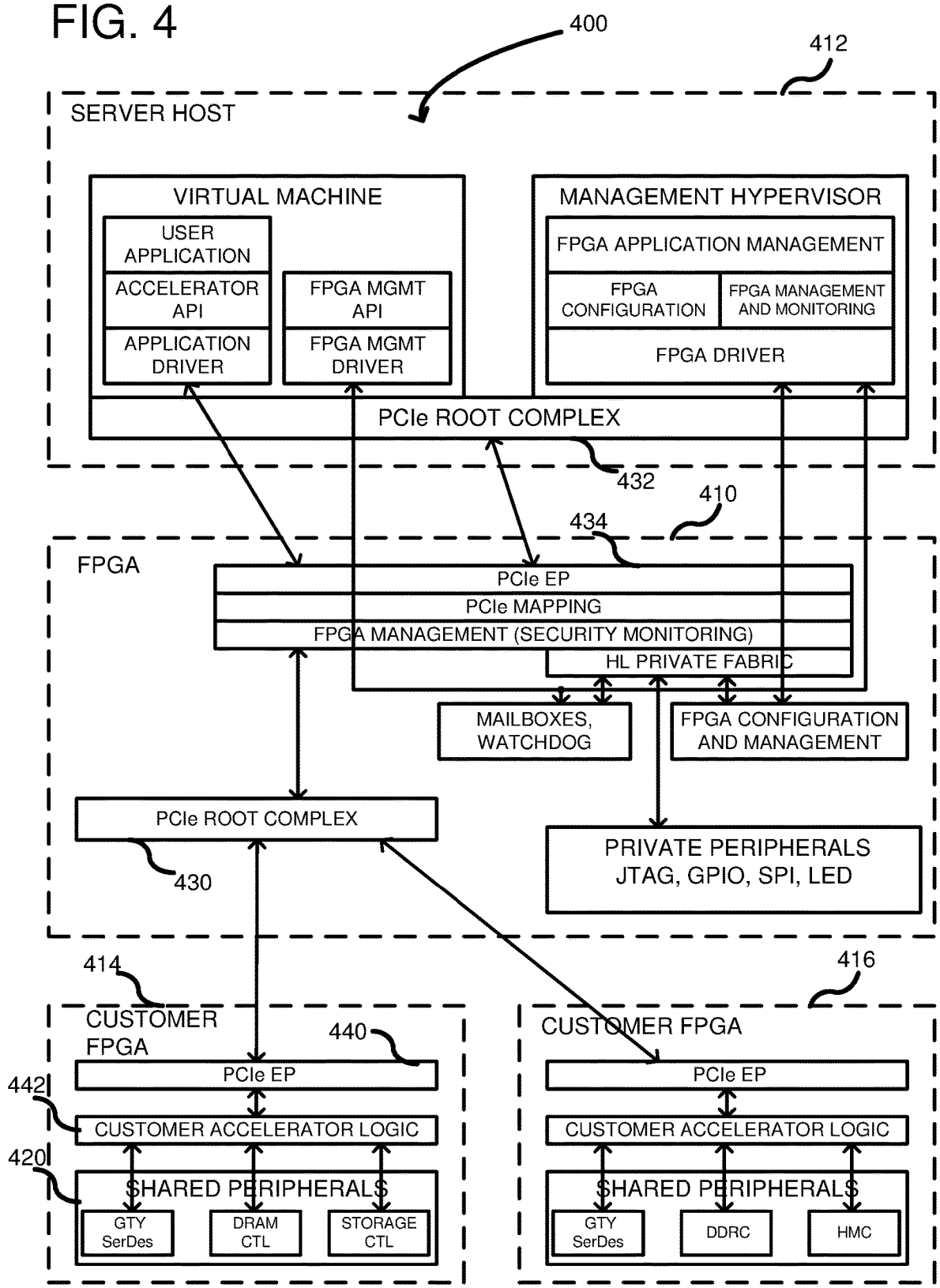
FIG. 4 is an example according to another embodiment, wherein the shared peripherals are located within the customer FPGAs.

FIG. 4 is an embodiment of a system 400 wherein an intermediate host FPGA 410 is positioned between a server host 412 and multiple customer FPGAs 414, 416. Many of the blocks associated with the server host 412 and the intermediate host FPGA are similar to blocks in FIG. 3 and are not re-explained for the purposes of brevity. However, in the FIG. 4 embodiment, shared peripherals 420 are positioned within the customer FPGAs 414, 416. As such, the intermediate FPGA 410 can include a PCIe root complex 430. Thus, a first root complex 432 in the server host 412 communicates a transaction to a PCIe endpoint 434 in the host FPGA 410. After the transaction passes through the PCIe mapping and FPGA management blocks, it passes to the second root complex 430 in the intermediate FPGA 410 that determines how to route the transaction. For example, the PCIe root complex 430 either routes the transaction to the customer FPGA 414 or the customer FPGA 416 depending on an identified address range associated with the transaction. The root complex 430 transmits the transaction to a PCIe endpoint 440 in the customer FPGA 414. The PCIe endpoint 440 then communicates the transaction to the customer accelerator logic 442. The customer accelerator logic 442 has access to shared peripherals 420, which contains peripheral logic as previously described and which is further described below.

Thus, in this embodiment, there are two layers of root complex, one of which is in the host server computer at 432, and a second in the intermediate host FPGA at 430. Like in FIG. 3, the intermediate FPGA allows control and management over the customer FPGA without requiring host logic, or with very little host logic within the customer FPGA. This allows the customer to have an experience as if they have control of the entire FPGA. Some host logic can be included in the customer FPGA by supplying the customer with encrypted RTL code that the customer can incorporate into their design.

Figure 5:
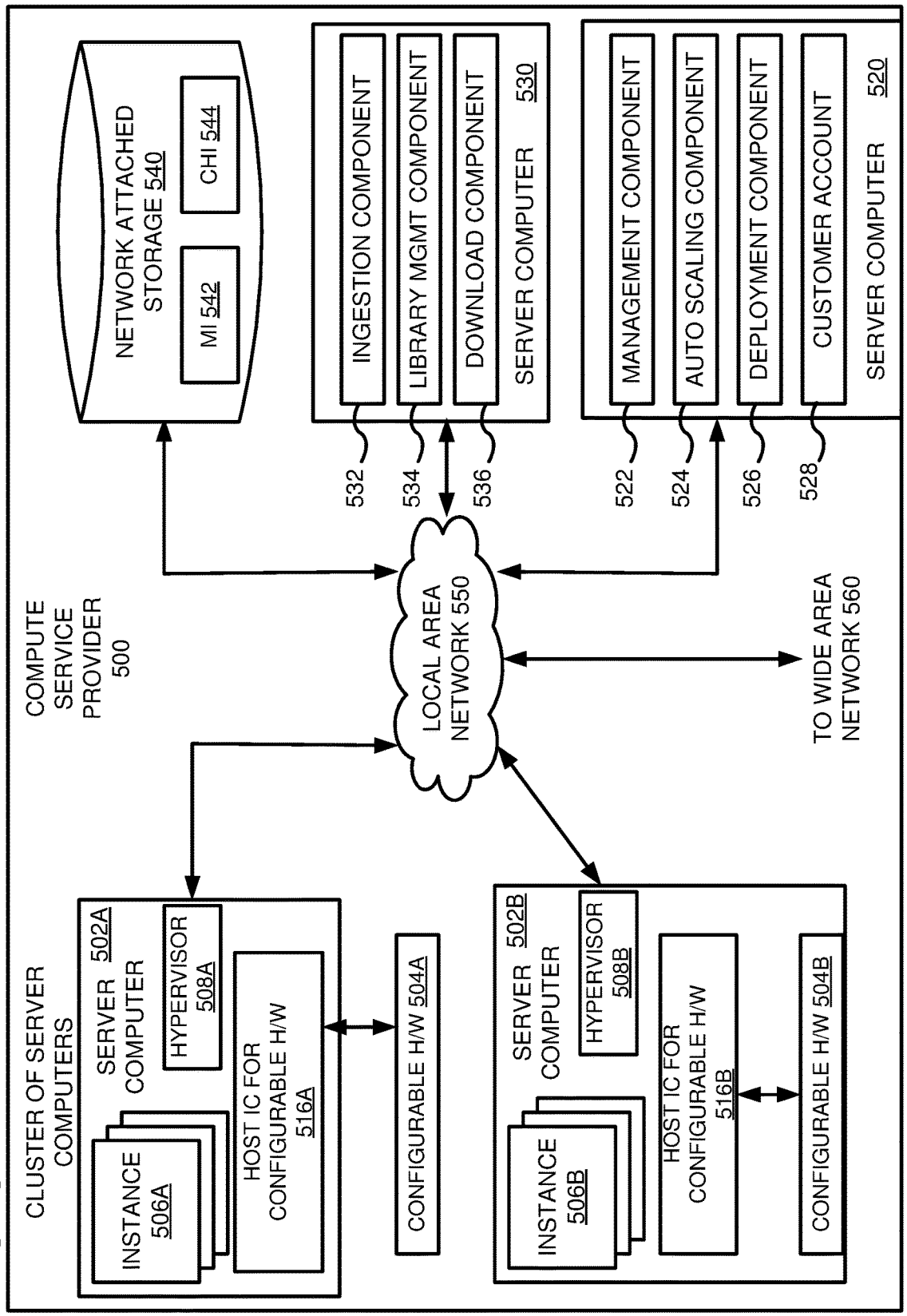
FIG. 5 is an example system diagram showing a plurality of virtual machine instances running in the multi-tenant environment with a host IC positioned between the virtual machines and the customer configurable hardware.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502B. While only two server computers are shown, any number can be used, and large centers can include thousands of server computers. The server computers 502A-502B can provide computing resources for executing software instances 506A-506B. In one embodiment, the software instances 506A-506B are virtual machines. As known in the art, a virtual machine is an instance of a software implementation of a machine (i.e. a computer) that executes applications like a physical machine. In the example of a virtual machine, each of the servers 502A-502B can be configured to execute a hypervisor 508 or another type of program configured to enable the execution of multiple software instances 506 on a single server. Additionally, each of the software instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 502A-502B can include a heterogeneous collection of different hardware resources or instance types. Some of the hardware instance types can include configurable hardware that is at least partially configurable by a user of the compute service provider 500. One example of an instance type can include the server computer 502A which is in communication with configurable hardware 504A via an intermediate host IC 516A. Specifically, the server computer 502A and the host IC 516A can communicate over a local interconnect, such as PCIe. Likewise, the host IC 516A and the configurable hardware 504A can communicate over a PCIe interface. Another example of an instance type can include the server computer 502B, the host IC 516B and configurable hardware 504B. For example, the configurable logic 504B can be integrated within a multi-chip module or on the same die as a CPU of the server computer 502B. Thus, the configurable hardware 504A, 504B can be positioned on or off of the server computer 502A, 502B. In still another embodiment, the host IC 516A or 516B can be positioned external to the host server computers 502A or 502B.

One or more server computers 520 can be reserved for executing software components for managing the operation of the server computers 502 and the software instances 506. For example, the server computer 520 can execute a management component 522. A customer can access the management component 522 to configure various aspects of the operation of the software instances 506 purchased by the customer. For example, the customer can purchase, rent or lease instances and make changes to the configuration of the software instances. The configuration information for each of the software instances can be stored as a machine image (MI) 542 on the network-attached storage 540. Specifically, the MI 542 describes the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 542 which is to be loaded on configurable hardware 504 when the instance is launched. The CHI includes configuration data for programming or configuring at least a portion of the configurable hardware 504.

The customer can also specify settings regarding how the purchased instances are to be scaled in response to demand. The management component can further include a policy document to implement customer policies. An auto scaling component 524 can scale the instances 506 based upon rules defined by the customer. In one embodiment, the auto scaling component 524 allows a customer to specify scale-up rules for use in determining when new instances should be instantiated and scale-down rules for use in determining when existing instances should be terminated. The auto scaling component 524 can consist of a number of subcomponents executing on different server computers 502 or other computing devices. The auto scaling component 524 can monitor available computing resources over an internal management network and modify resources available based on need.

A deployment component 526 can be used to assist customers in the deployment of new instances 506 of computing resources. The deployment component can have access to account information associated with the instances, such as who is the owner of the account, credit card information, country of the owner, etc. The deployment component 526 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 526 can utilize the customer-provided configuration and cache logic to configure, prime, and launch new instances 506. The configuration, cache logic, and other information may be specified by a customer using the management component 522 or by providing this information directly to the deployment component 526. The instance manager can be considered part of the deployment component.

Customer account information 528 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 530 can be reserved for executing software components for managing the download of configuration data to configurable hardware 504 of the server computers 502. For example, the server computer 530 can execute a logic repository service comprising an ingestion component 532, a library management component 534, and a download component 536. The ingestion component 532 can receive host logic and application logic designs or specifications and generate configuration data that can be used to configure the configurable hardware 504. The library management component 534 can be used to manage source code, user information, and configuration data associated with the logic repository service. For example, the library management component 534 can be used to store configuration data generated from a user's design in a location specified by the user on the network-attached storage 540. In particular, the configuration data can be stored within a configurable hardware image 542 on the network-attached storage 540. Additionally, the library management component 534 can manage the versioning and storage of input files (such as the specifications for the application logic and the host logic) and metadata about the logic designs and/or the users of the logic repository service. The library management component 534 can index the generated configuration data by one or more properties such as a user identifier, an instance type, a marketplace identifier, a machine image identifier, and a configurable hardware identifier, for example. The download component 536 can be used to authenticate requests for configuration data and to transmit the configuration data to the requestor when the request is authenticated. For example, agents on the server computers 502A-B can send requests to the download component 536 when the instances 506 are launched that use the configurable hardware 504. As another example, the agents on the server computers 502A-B can send requests to the download component 536 when the instances 506 request that the configurable hardware 504 be partially reconfigured while the configurable hardware 504 is in operation.

The network-attached storage (NAS) 540 can be used to provide storage space and access to files stored on the NAS 540. For example, the NAS 540 can include one or more server computers used for processing requests using a network file sharing protocol, such as Network File System (NFS). The NAS 540 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 550.

The network 550 can be utilized to interconnect the server computers 502A-502B, the server computers 520 and 530, and the storage 540. The network 550 can be a local area network (LAN) and can be connected to a Wide Area Network (WAN) 560 so that end users can access the compute service provider 500. It should be appreciated that the network topology illustrated in FIG. 5 has been simplified and that many more networks and networking devices can be utilized to interconnect the various computing systems disclosed herein.

Figure 6:
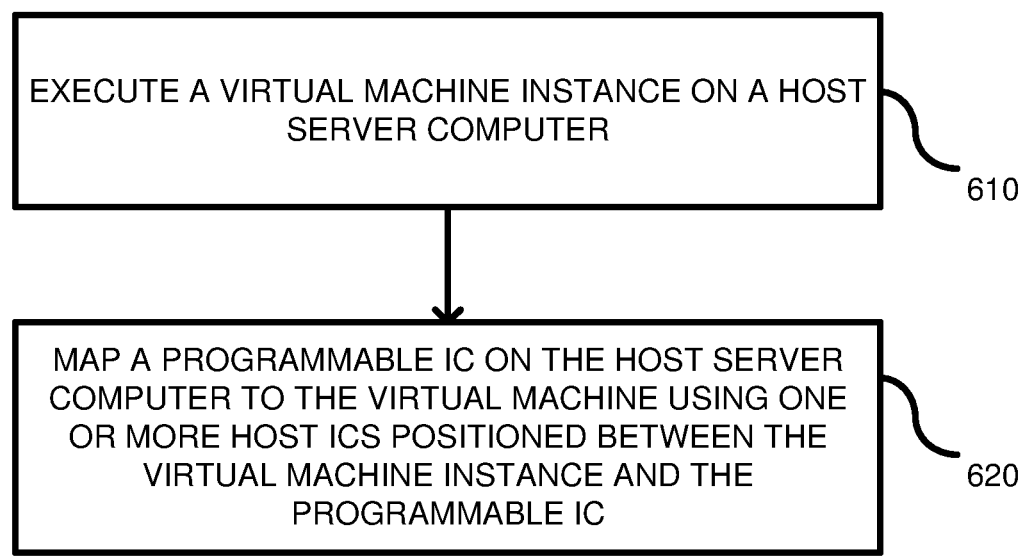
FIG. 6 is a flowchart of a method for using an intermediate host IC to route requests to programmable ICs.

FIG. 6 is a flowchart of a method for controlling programmable hardware in a multi-tenant environment. In process block 610, a virtual machine instance is executed on a host server computer. The virtual machine can be a local virtual machine on the host server computer. In other embodiments, the virtual machine can be located on a separate host server computer. In a particular example, the virtual machine on the separate host server computer can communicate through a network to a management hypervisor on the host server computer on which a programmable circuit is located.

In process block 620, a programmable IC can be mapped to the virtual machine instance. For example, one or more host ICs can be positioned between the virtual machine instance and the programmable IC. For example, in FIG. 1, the host logic IC 122 can be positioned between multiple programmable ICs 120 and the virtual machines 140 and performs a mapping so as to route data communications (e.g., data) from the virtual machines to the proper programmable IC and vice versa.

In some embodiments, the programmable IC can include a customer portion and a host portion. For example, in FIG. 3 some host logic (i.e., host logic wrapper 382 and inter-FPGA transport 380) is included in the customer FPGA to facilitate communication with the host FPGA. The customer FPGAs 314, 316 can communicate with the host IC in order to access shared peripherals 362. The host IC can include logic to ensure that each customer has access to resources (e.g., bandwidth) associated with the shared peripherals. Likewise, the host IC can ensure that each customer has adequate access to the PCIe endpoint.

Figure 7:
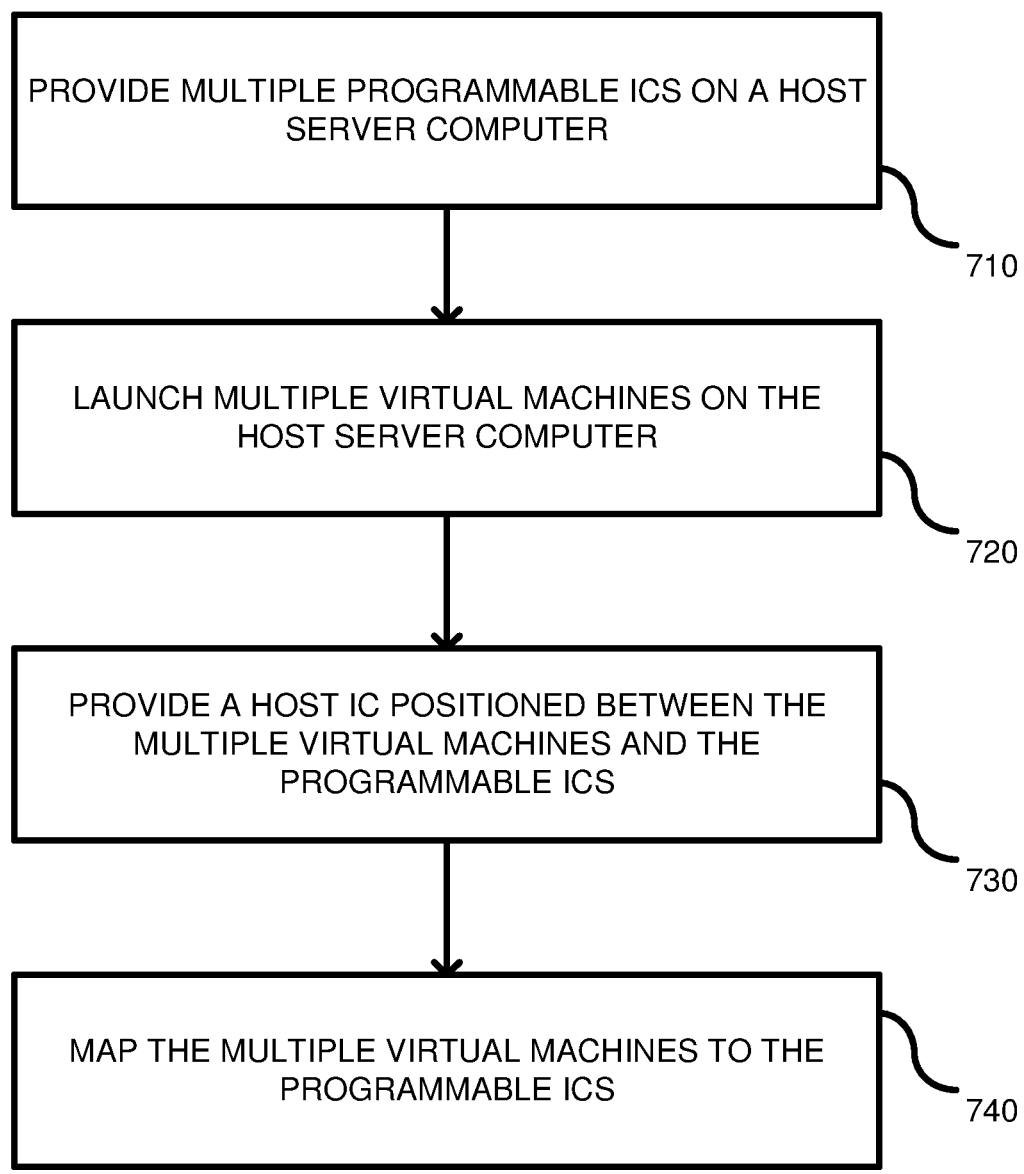
FIG. 7 is a flowchart of a method according to another embodiment for using an intermediate host to route requests to programmable ICs.

FIG. 7 is a flowchart of a method for controlling programmable hardware in a multi-tenant environment according to another embodiment. In process block 710, multiple programmable ICs are provided on a host server computer. For example, in FIG. 1 the programmable ICs 150 are shown as including any desired number of ICs. The programmable ICs are typically FPGAs but other programmable ICs can be used. The programmable ICs allow programming to form logic gates and other hardware logic. In process block 720, multiple virtual machines are launched on the host server computer. Again, returning to FIG. 1, any number of virtual machines 140 can be launched on the host server computer. In process block 730, a host IC is positioned between the multiple virtual machines and the programmable ICs. The host IC can include mapping logic (e.g., see 264 in FIG. 2) and management logic (e.g., see 266 in FIG. 2). The host IC also includes upstream and downstream interfaces for communicating with the virtual machines and programmable ICs, respectively. In process block 740, the multiple virtual machines can be mapped to the programmable ICs. The mapping is performed by an intermediate host IC that includes the appropriate address ranges associated with the programmable ICs and the virtual machines. The multiple programmable ICs can be associated with different customers and the host IC can perform management functions to ensure that the programmable ICs are sandboxed. Consequently, any data associated with a programmable IC associated with one customer is not obtainable by another customer. In some embodiments, communication between the host IC and the programmable ICs can occur through a serial communication port, such as a Serdes port. Other inter-FPGA transport interfaces can be used. In some embodiments, the host IC can include a root complex (see FIG. 4 at 430) for communicating with an endpoint (see FIG. 4 at 440) on the customer FPGA.

Figure 8:
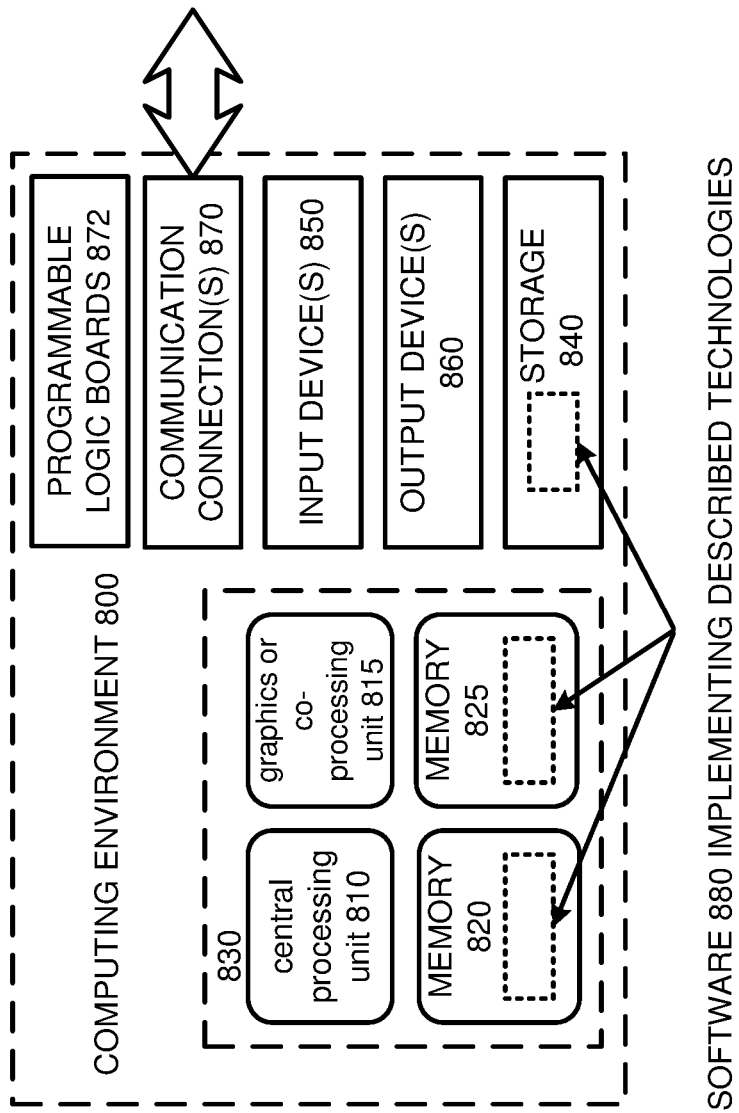
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800. The computing system can also include one or more plug-in boards 872 that include the programmable ICs described herein.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

FIG. 9 is a system diagram showing an example computing system 900 including a host server computer 902 having a software portion 904 and a hardware portion 906 diagrammatically separated by dashed line 908. The hardware portion 906 includes one or more CPUs, memory, storage devices, etc. shown generically as other hardware at 910. The hardware portion 906 can further include programmable Integrated Circuits (ICs), shown generally at 920. The programmable ICs can be FPGAs or other types of programmable logic, such as complex programmable logic devices (CPLDs). Any number of programmable ICs 920 can be used in the host server computer 902 as further described below. Furthermore, the programmable ICs 920 can include logic from different customers so that multiple customers are operating on a same server computer 902 without knowing each other's presence.

The hardware portion 906 further includes two or more intermediate host logic ICs 922, 923 that performs management, security and mapping functions between the programmable ICs 920 and the software portion 904. The host logic ICs can also be reprogrammable logic, such as an FPGA, or otherwise non-reprogrammable hardware, such as an ASIC or a SoC.

Running a layer above the hardware 906 in the software portion 904 is a hypervisor or kernel layer, shown in this example as including a management hyperviser 930. The management hypervisor 930 can generally include device drivers needed for accessing the hardware 906. The software portion 904 can include a plurality of partitions for running virtual machines, shown generally at 940. The partitions are logical units of isolation by the hypervisor and are executing virtual machines. Each partition can be allocated its own portion of the hardware layer's memory, CPU allocation, storage, etc. Additionally, each partition can include a virtual machine and its own guest operating system. Each virtual machine 940 can communicate through a hardware interface (not shown, but described further below) to one of the host logic ICs 922, 923. The host logic ICs 922, 923 can map the communication to the appropriate programmable IC 920 so that the programmable ICs 920 believe they are communicating directly with the virtual machines 940. In some embodiments, a thin layer of host logic 950 can be included in the programmable IC 920 associated with the customer. The mapping is accomplished through an address mapping wherein logical and physical addresses can be stored in the host IC so as to link one to the other.

Although two host logic ICs 922, 923 are shown, any number of host logic ICs can be used. Additionally, although the host logic ICs are shown within the host server computer 902, in any of the embodiments described herein, the host logic IC or ICs can be positioned external to the host server computer 902. In such a case, the programmable ICs 920 can also be external to the host server computer 902.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Any of these devices can be used in the embodiments described herein.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. An apparatus in a multi-tenant environment, comprising:
   a host server computer, the host server computer having a processor configured to execute a management hypervisor and at least first and second virtual machine instances;
   a first programmable integrated circuit (IC) within the host server computer, the first programmable integrated circuit being programmable to include hardware logic associated with the first virtual machine instance, wherein the first programmable IC includes first host logic integrated into first client logic, wherein the first host logic includes a first host interface;
   a second programmable IC, physically separated from the first programmable IC, within the host server computer, the second programmable integrated circuit being programmable to include hardware logic associated with the second virtual machine instance, wherein the second programmable IC includes second host logic integrated into second client logic, wherein the second host logic includes a second host interface; and
   a host IC within the host server computer, which is programmable and physically separated from the first programmable IC and the second programmable IC, between the first virtual machine instance and the first programmable IC and between the second virtual machine instance and the second programmable IC, the host IC mapping the first programmable IC to the first virtual machine instance and mapping the second programmable IC to the second virtual machine instance, the host IC having hardware used by the management hypervisor to program the first programmable IC and the second programmable IC, the host IC further including encapsulation logic configured to ensure that a user of the first programmable IC cannot obtain access to secure information associated with the second programmable IC, wherein the encapsulation logic is configured to control signals on a bus of the host server computer and to prevent the first programmable IC from controlling the signals on the bus, wherein the host IC includes a third host interface compatible for communication with the first host interface of the first programmable IC and the second host interface of the second programmable IC, wherein the host IC further includes a fourth Peripheral Component Interconnect (PCI) interface coupled to the third host interface, the PCI interface coupling the processor in the host server computer to the host IC.

2. The apparatus of claim 1, wherein the host IC includes an interface endpoint for communication with the first and second virtual machine instances, and an interface for communicating with the first and second programmable ICs.

3. The apparatus of claim 1, wherein the host IC includes mapping logic to associate the first virtual machine instance with either of the first or second programmable IC.

4. The apparatus of claim 1, wherein each of the first and second programmable IC have sandboxed hardware logic programmed therein.

5. The apparatus of claim 1, wherein the host IC includes shared peripherals and wherein the host IC controls an amount of resources each of the first and second programmable ICs can use.

6. The apparatus of claim 1, wherein the host IC includes routing logic and the first and second programmable ICs include interface endpoints for communicating with the host IC.

7. A method of controlling programmable hardware in a multi-tenant environment, comprising:
   executing a virtual machine instance on a host server computer in the multi-tenant environment, the host server computer including multiple programmable Integrated Circuits (ICs) that are physically separated from each other and a processor executing the virtual machine instance; and
   mapping a first of the multiple programmable ICs to the virtual machine instance using one or more host ICs positioned between the virtual machine instance and the multiple programmable ICs, wherein the one or more host ICs are physically separated from the multiple programmable ICs and includes configuration functionality in communication with a hypervisor to program the first of the multiple programmable ICs, the one or more host ICs including encapsulation logic to ensure that a user of one of the multiple programmable ICs cannot obtain access to secure information associated with another user of one of the multiple programmable ICs, wherein the encapsulation logic controls signals on a bus of the host server computer to restrict use of the bus by the first programmable IC, wherein the one or more host ICs further includes a Peripheral Component Interconnect (PCI) interface in communication with the processor and wherein the one more host ICs further include a host interface coupled to the PCI interface and coupled to the first of the multiple programmable ICs allowing communications between the first of the multiple programmable ICs and the processor through the host interface and through the PCI interface.

8. The method of claim 7, wherein the host IC has an interface endpoint for communicating with the virtual machine instance, and routing logic for communicating with an endpoint within the first programmable IC.

9. The method of claim 7, wherein the first programmable IC includes a portion associated with the virtual machine instance and a host portion and the host portion includes an interface for communicating with the host IC.

10. The method of claim 7, wherein the host IC includes shared peripherals including a serial port.

11. The method of claim 7, wherein the host server computer includes the hypervisor, and the method further includes launching the virtual machine instance using the hypervisor and configuring the one or more host ICs.

12. The method of claim 7, wherein the multiple programmable ICs are Field Programmable Gate Arrays (FPGAs).

13. The method of claim 7, wherein the host IC is a Field Programmable Gate Array (FPGA).

14. The method of claim 7, wherein the multiple programmable ICs are coupled to the host IC through a peripheral bus.

15. A method, comprising:
   providing multiple programmable Integrated Circuits (ICs) on a host server computer each of the multiple programmable ICs including a host interface;
   launching multiple virtual machines on the host server computer, the host server computer including a processor executing the multiple virtual machines;
   providing a host IC positioned between the multiple virtual machines and the programmable ICs, wherein the host IC includes configuration hardware through which a hypervisor, executing on the host server computer, uses to configure the multiple programmable ICs and wherein the host IC is a physically separate IC from the programmable ICs and wherein the host IC includes encapsulation logic that prevents the first programmable IC from controlling the signals on a bus used by the first programmable IC for communicating with the virtual machines, wherein the host IC includes an interface coupled to the host interfaces of the multiple programmable ICs and the host IC includes a Peripheral Component Interconnect (PCI) interface coupled to the processor, wherein the interface in the host IC is coupled to the PCI interface to allow communications therebetween;
   mapping the multiple virtual machines to the multiple programmable ICs; and
   transmitting communications from the multiple virtual machines through the PCI interface in the host, then through the interface within the host IC and then through the host interfaces of the multiple programmable ICs.

16. The method of claim 15, wherein the host IC includes shared resources and the host IC distributes resources associated with the shared resources to the multiple programmable ICs.

17. The method of claim 15, wherein communication is blocked between the programmable ICs.

18. The method of claim 15, wherein the host IC is a Field Programmable Gate Array or a System on Chip (SoC).

19. The method of claim 15, wherein the host IC communicates through a serial port with the multiple programmable ICs.

20. The method of claim 15, wherein the host IC includes an endpoint for communicating with the multiple virtual machines and a root complex for communicating with the multiple programmable ICs.

* * * * *